Warren A. Alexander
Benjamin F. McCoy   Inventors

By James A. Reilly   Attorney

Oct. 22, 1963 W. A. ALEXANDER ETAL 3,108,248
METHOD FOR ANALYZING GEOPHYSICAL RECORDS
Filed Dec. 29, 1958 6 Sheets-Sheet 3

THE AMOUNT OF MIX IS DETERMINED BY THE AMPLITUDE
OF THE SQUARE WAVE

——— VERTICAL SAWTOOTH FIELD 60 CPS
——— SQUARE WAVE 30 CPS

FIG. 3

Warren A. Alexander
Benjamin F. McCoy    Inventors
By *James A. Reilly*    Attorney

FIG. 4

Warren A. Alexander
Benjamin F. McCoy    Inventors
By James A. Reilly  Attorney

FIG. 5

Warren A. Alexander
Benjamin F. McCoy  Inventors

By *James A. Reilly*  Attorney

FIG. 6

Warren A. Alexander
Benjamin F. McCoy    Inventors

By James A. Reilly   Attorney

United States Patent Office 3,108,248
Patented Oct. 22, 1963

3,108,248
METHOD FOR ANALYZING GEOPHYSICAL
RECORDS
Warren A. Alexander and Benjamin F. McCoy, Tulsa,
Okla., assignors to Jersey Production Research Company, a corporation of Delaware
Filed Dec. 29, 1958, Ser. No. 783,482
11 Claims. (Cl. 340—15.5)

This invention relates to the production, analysis, and correlation of seismic records, and more particularly to a system for scanning and reproducing information on a reproducible seismic record to establish and illustrate the most probable correlation of the information in the record. The invention especially is directed toward a method and apparatus for systematically producing a reproducible type seismic record, visually processing the produced information to emphasize obscured information concerning seismic events of interest, and thereafter recording and incorporating the information of interest in a form more suitable for seismic interpretation. In a preferred embodiment of the invention, means are provided for systematically processing the information recorded within a seismic record to emphasize the most probable location and orientation of reflections within the record. Thereafter, a variable density type seismic record is produced in which the emphasized information is recorded so as to exhibit its most probable orientation and also so as to minimize spurious information.

Geophysical prospecting procedures utilizing artificially induced seismic disturbances have found wide application in the search for petroleum and other mineral deposits. In such methods, an explosion or other seismic disturbance is initiated at a point near the surface of the earth and the resulting primary wave is propagated through the earth. It is in part reflected, refracted and diffracted by the various discontinuities which it encounters but portions of the reflected and diffracted wave fronts return to the earth's surface. By arranging a plurality of vibration sensitive seismic detectors in an array at spaced distances from the disturbance point, arrivals of reflected waves at the surface of the earth can be detected. Furthermore, by the use of a seismograph, there can be determined not only the magnitude of the reflected signal received by the various detectors, but also the time intervals required for travel of seismic energy from the disturbance point down to the various reflecting discontinuities and thence to the detectors. Once this information has been ascertained, it is possible to determine the position and relative depths of the various reflecting discontinuities beneath the surface of the earth by measuring the distances between the various detectors and the disturbance points, and by using measured or assumed velocities of seismic waves in the particular section of the earth under study.

Conventionally, signals generated by an array, sometimes called a spread, of detectors in seismic observations are recorded by a seismograph in the form of separate side-by-side channels or traces of information on suitable recording medium. Each trace of information on the seismogram is, in effect, a record of the seismic signal which has been generated at a particular seismic detector station in the observation. Thus, a seismic signal can be considered to be an electrical transient generated by a seismic detector during the interval of a seismic observation. Also, conveniently, it is considered to be a signal recorded from a detector as a trace or channel of information on a seismogram. Depending on the recording method used, the seismogram may be of the variable amplitude type, wherein the record is produced in the form of an oscillatory line whose amplitude of oscillations is proportional to the intensity of the electrical impulses. Alternately, it can be of the variable density type in which the record is produced in the form of a track wherein the density of the light image is proportional to the intensity of the impulses. The present invention relates to the use of variable density form records which have the advantage of being capable of reconversion into electrical impulses for purposes of subsequent recreation of their wave forms.

Inasmuch as individual geophone or detector stations in a seismic observation are generally at different distances from the shock point and also because the stations are generally at different levels relative to a predetermined datum level, corresponding reflections on the different traces of a seismogram usually occur at different points along the seismogram. In order to accurately interpret the information on the seismogram, it is therefore necessary to apply corrections to the individual traces. These corrections include so-called static or fixed corrections such as elevation and weathering corrections, as well as dynamic or variable corrections. Each point along any given seismic trace receives the same amount of the static type of correction. Dynamic corrections, on the other hand, include spread corrections and each point along any given seismic trace generally receives a different amount of this type of correction. The trace information, within a corrected seismic section, is also preferably adjusted in width so as to correspond to spacing of the detector stations corresponding to the traces.

A particularly effective and attractive system for recording seismic trace information involves recording each trace signal as a reproducible trace or channel of information. Reproducible traces, for example, include magnetic traces, variable density photographic traces, variable area photographic traces, and variable color photographic traces, and the like. All of such traces are characterized by the property that the signals recorded thereon readily can be reproduced from the traces by simply scanning the traces with suitable reproduction devices.

As any one seismogram from a single observation is generally made up of the information received from some twenty or more detector locations, it will be recognized that one interpreting a seismic record is faced with a serious problem of selecting significant information and discarding the insignificant. The interpreter must also perform complicated mathematical analysis of the selected information, incorporating corrections for such factors as geophone elevation and spacing and "spread" before intelligent analysis of the information is completely possible.

Recently, various forms of equipment have been developed for reproducing the signals recorded on such traces, applying static and dynamic corrections to the traces, and thereafter recording and incorporating the trace information within a corrected seismic section. For example, equipment is now available which is capable of semi-automatically "playing-back" an uncorrected seismogram to form a corrected seismogram or seismic section in which errors occasioned by the low velocity layer, different geophone elevations and spread distances are corrected for.

The final assembly of traces generally constitutes a very striking representation of the structure of the cross-section of the earth and in good seismic recording areas, variable density seismic sections very clearly exhibit the orientation and locations of the reflecting structures within a portion of the earth.

Nevertheless, on numerous occasions seismic information has been so complex as to render interpretation of seismic records almost impossible. The information on the seismograms and corrected sections can be so confusing that often it has been extremely difficult, for example, to determine or follow reflection crossings on the records. Furthermore, unfortunately this type of record is frequently obtained in areas of complex geology where the possibilities of oil traps and the like are especially favorable. Thus, a pressing problem has involved the finding of more suitable and satisfactory systems for gleaning information of interest from seismic records. Of particular interest, has been the need to develop a system of seismic analysis in which the orientation and nature of obscured reflecting sub-surfaces can be ascertained. Now, the above and other disadvantages of the prior art have been obviated by the present invention, which provides an improved system for processing and analyzing seismic data in which the task of interpreting such data is expedited and facilitated.

Briefly, in accordance with the present invention, there is provided means for systematically processing a reproducible seismic record in a manner to exhibit visually the most probable orientation and location of subterranean structures within the portion of the earth corresponding to the record. Further, the invention provides a method and apparatus which makes it possible to analyze and interpret variable density seismic sections which heretofore have been extremely difficult or impossible to interpret.

Heretofore, with electronic playback systems for correlating information in seismic records, corrections predicted largely on the basis of interpreting experience have been fed into the playback apparatus and thereafter an entire seismic section incorporating that particular set of predetermined corrections printed for study and analysis. Ideally, processes are chosen to modify the time relationship and amplitude and frequency variations of the signals as they appear in the separate channels on the record, in a manner which permits the emphasized information to be recorded so as to exhibit its most probable orientation and location. With such a large number of variables, it becomes necessary to duplicate the entire reproduction procedure many times using various combinations of processes in order to insure that information concerning seismic events of interest will not remain obscured. Needles to say, this procedure is extremely time-consuming, expensive and tedious. Furthermore, the value of the sismic section ultimately obtained is to a great extent controlled by the operator's personal opinion and judgment.

In view of the above factors that presently militate against the use of precision seismic procedures, it is a primary object of the present invention to provide an apparatus and method for accelerating and facilitating the processing of information from seismograms. More particularly, it is an object of this invention to improve upon the accuracy, speed and reliability of methods for interpreting seismic data. It is still further an object of the invention to provide an apparatus and method for extracting information from seismograms and for systematically processing and organizing the information for reproduction on a reproducible seismic record in suitable form to illustrate the most probable correlation of the information in the record.

These and other related objectives, which will be explicity described or readily apparent from the following description, are attained in accordance with the present invention by systematically scanning a reproducible seismic record in the time direction of the record to produce trace signals therefrom, transmitting the signal output to visual display means including a cathode ray tube and processing the record continuously by the use of processing means comprising a variable characteristic bandpass filter network and a time axis adjusting network interconnecting the scanner and the visual display means to adjust and correct the seismic record from which the trace signals are derived.

Essentially, what has now been discovered is a correlation system in which reproducible multi-trace seismic records are reproduced over short intervals of the records; the reproduced information is processed electronically so as to visibly emphasize reflection events having consistent shapes and lying in approximately straight lines across the records; and thereafter the original record is reprinted with the processed information predominating. The new record, in a sense, therefore, is a correlated record dimensionally proportional or otherwise consistent with the original record but exhibiting an improved correlation of the information of most probable interest on the record.

The original seismic records which are processed in accordance with the present invention are of the reproducible type in which a zero seismic signal is represented on the records by a neutral value. Variable density sections are the preferred form of reproducible records and advantageously are of a type such that a zero seismic signal is recorded as a neutral grey shade. Signals other than zero are recorded as shades lighter or darker than grey, depending upon their algebraic sign.

In order to process a variable density seismic section in accordance with the method of this invention a high speed scanner is used to scan a section at a high rate in the time direction on the section, so that the signal output is seismic signal at a high frequency. For example, 40 c.p.s. can appear as about 1 megacycle. The final section is presented on a large screen cathode ray tube such as a television screen. Since the scan is at such a high rate, variations in the processing electrons appear on the screen as continuos variations, so the optimum processing corrections can be determined. This established processing method is then carried out on a magnetic playback system in order to get a permanent record of the result.

The ability to observe the results of the processing on a screen as the several types of corrections are continuously varied makes it possible to determine the very best system of processing in a very short time. Such processing can include variations in contrast and brightness, variations in filtering, including the band width, high cut and low cut frequencies and cut off rate, and the application of velocity functions. Also, corrections, both static and dynamic, can be introduced, vertical and horizontal scales can be altered, and seismic traces can be mixed or composited. In this manner subtle events of interest can be emphasized while non-significant events are minimized, and an optimum set of processing conditions can be chosen to produce a reproducible seismic record more suitable for seismic interpretation than heretofore obtainable.

The above and further objects and features of the invention will be more fully appreciated from the following description taken in connection with the accompanying drawing in which.

Figure 1:
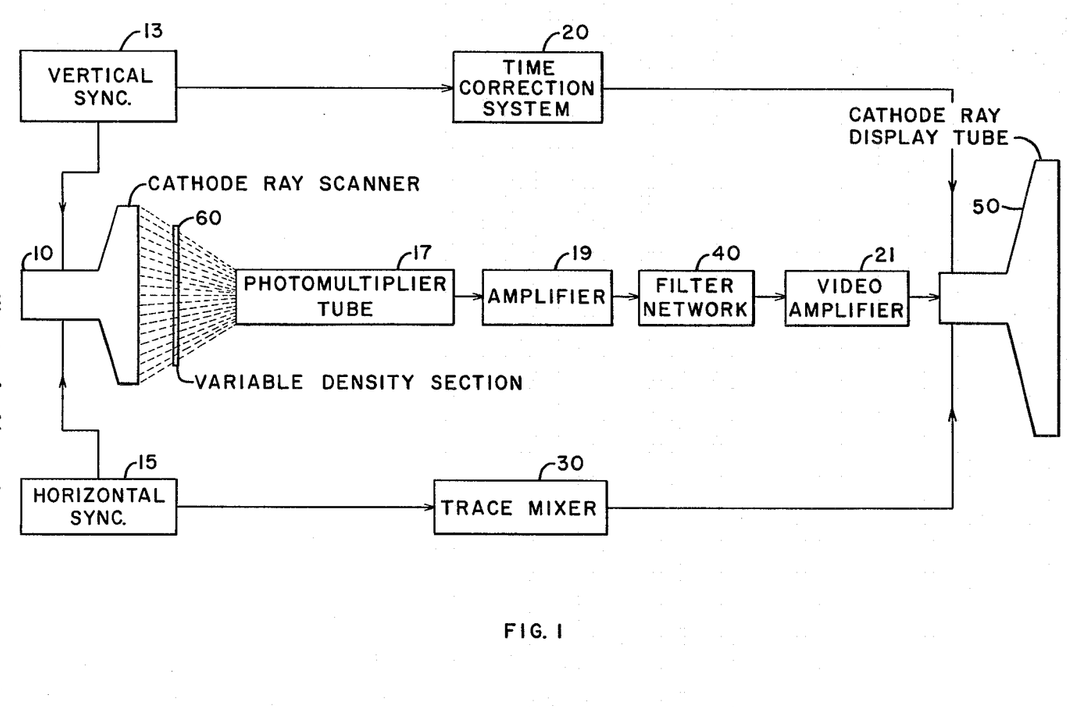
FIG. 1 illustrates schematically a preferred embodiment of the invention as well as the best mode contemplated for carrying out the invention.

Referring first to FIG. 1, the major apparatus components shown in this figure include a high speed scanner 10 which can be of the cathode ray tube type including a suitable vertical synchronization circuit 13 and horizontal synchronization circuit 15, a high sensitivity photomultiplier tube 17, amplifier 19, time correction system 20, trace mixer 30, frequency filter network 40, video amplifier 21 and cathode ray display tube 50. A variable density form seismic section film 60 is shown disposed between cathode ray scanner 10 and the photomultiplier tube 17 in position to be processed in accordance with the present invention.

As has been stated above the hgh-speed scanner of the apparatus of the present invention preferably is of the cathode ray tube type. The scan is in the time direction of the seismic section so that the signal output is a seismic signal at high frequency. Advantageously a flying spot scanner, scanning at a rate in the range of 5 to 50 frames per second is employed. The relative scales are such that for example, 40 cycles per second can appear as about 1 kilocycle to 1 megacycle. It is only necessary that the scan is at such a high rate that variations in the processing electronics appear on the cathode ray display tube as continuous variations. A photomultiplier tube 17 having high sensivtiity and a high frequency response is coupled to scanner 10 by transmission through a variable density form seismic section film. Alternately it can be employed to pick up the reflection from an opaque variable density section.

The resolution of the detail on the seismic sections must be good enough to show clearly the highest frequency events of interest. This is usually no higher than 150 cycles per second, or a wave length of 0.00067 second, which on the time scale employed is about 0.02 inch per wave length. For useable resolution the recording means should have a dimension in the time direction of no more than one-fourth of a wave length. In order to satisfy these conditions, the cathode spot must be held to about 0.005 inch, or, the time axis expanded to permit the desired relation. Advantageously, a commercial large screen cathode ray oscilloscope can be employed. Since the cathode spot on the conventional equipment is about 0.05 inch, the time scale can be expanded to correspond to this limitation, thus making the presentation time scale about 30 inches per second.

Amplified signals from amplifier 19 are filtered in filter network 40 having variable parameters within the pass band between 500 cycles per second and 2 megacycles. The amplifier and filter network can be of any suitable design, their functions being to amplify the incoming signal to a level suitable for recording and for filtering out signals which do not contribute to the interpretation of the record. A suitable amplifier is one that provides for amplification factors in the range of 50 to 200 decibels. The filter network is adapted to filter out signals having frequencies outside the range which it is desired to record, thus for seismic work "ground roll" having frequencies below 15 cycles per second and wind noise having frequencies of 150 cycles per second or higher would be filtered out. Preferably the filter will have a band width of about one or two octaves.

Trace mixer 30 allows the seismic signals to be mixed or compensated during processing and then passed to the cathode ray display tube for visual inspection. It is frequently desirable to mix the output of two or more spaced seismometers in order to accentuate reflections which are of necessity recorded in conjunction with random distrubances and other undesired waves.

Reflections can best be accentuated when they arrive in time-phase coincidence on the signal channels whose outputs are being mixed. Usually such coincidence does not exist however. In fact, it is possible that a reflection may arrive on adjacent channels in phase time opposition with the result that mixing obscures rather than accentuates the desired reflection with consequent loss of data which should have been available from the record. Heretofore the individual uncompensated outputs of separate seismometers have been recorded in reproducible form on a common strip medium. As discussed above, in order to check such a record for all reasonably possible conditions of time-phase relationships, it would be necessary to repeatedly reproduce the original record with pick-up points compensated for the time differences which would exist under successively changing assumptions as to dip of reflecting strata. By means of the present apparatus the record is rapidly scanned visually for all reasonably possible conditions of time-phase relationships and optimum mixing observed. This mixing can then be used in the reproduction of the final record on conventional playback apparatus.

Figure 2:
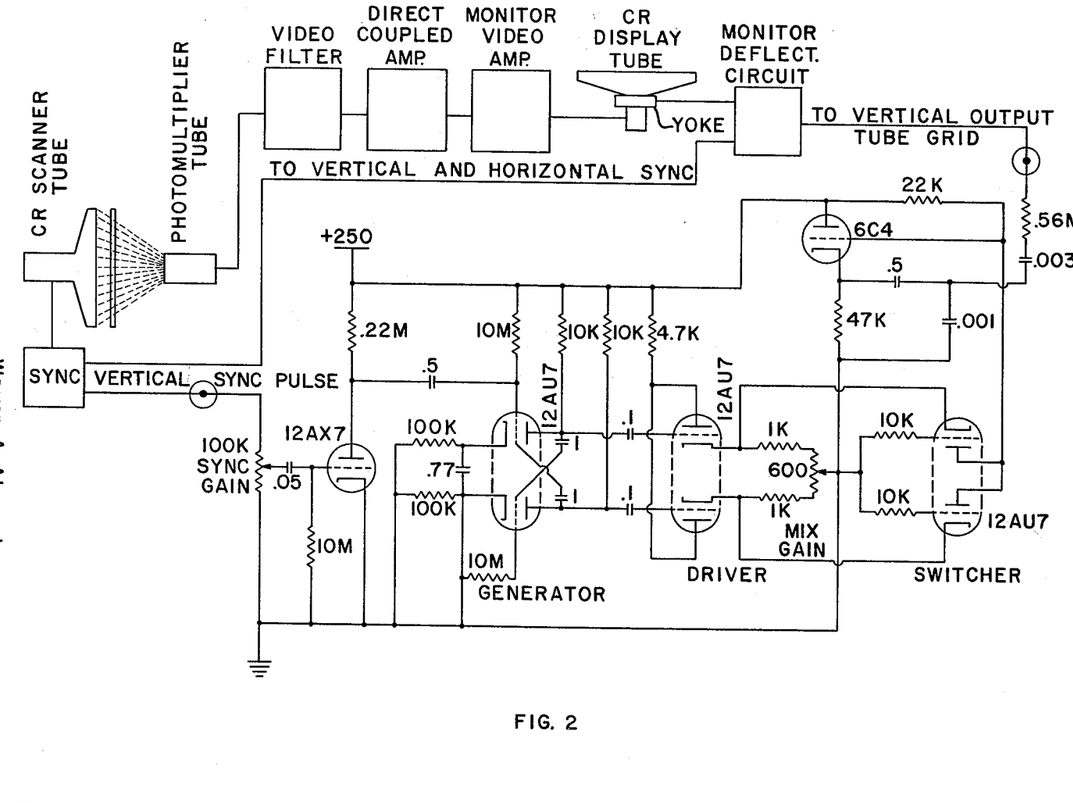
FIG. 2 is a schematic diagram of the processing apparatus of this invention including a trace mixing circuit by which individual traces are composited.

Essentially trace mixer 30 is adapted to display on the cathode ray screen the alternate frames with a controlled amount of horizontal displacement. That is, the even frames might be considered as centered on the screen, and the odd frames shifted off center by the width of a single channel. The resulting effect is to give an optical or an apparent, mix of adjacent seismic traces. The horizontal shift of the odd frames is accomplished by adding a square wave signal to the sawtooth horizontal sweep signal. The amount of overlap, or mix, is adjusted by the amplitude of the square wave that is added. FIG. 2 is the specific circuit diagram of the square wave generator, and FIG. 3 shows the amplitude vs. time relaxation of the sawtooth sweep signals and the square wave mixing signals.

Figure 3:
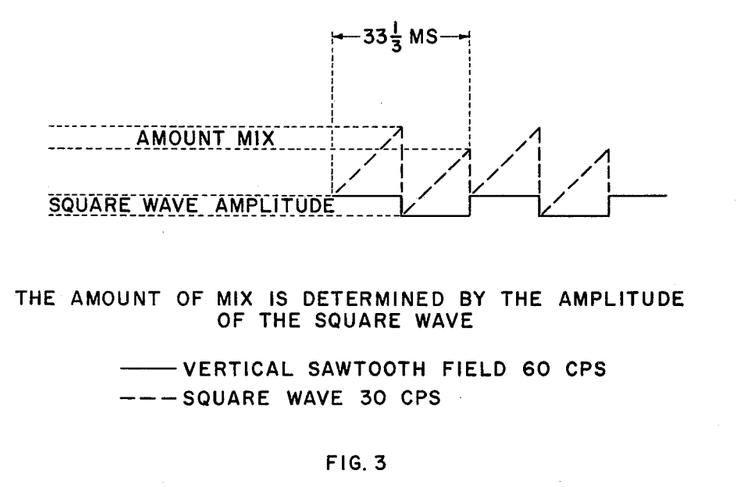
FIG. 3 is a schematic representation illustrating how frame sweep voltages are used to make a mixed trace section when the method of this invention is employed.

It is evident then that in FIG. 3 the first frame is shifted a certain amount by having the added voltage of the square wave added to it. The second frame, however, is not shifted. The alternating positions of the successive frames then lead to an optical mix on the display cathode ray tube.

For instance, trace $n$ is shifted on the first frame to the position where trace $n+1$ is located on the second frame. The resulting effect is that one sees at that location the average, or mix, of trace $n$ and trace $n+1$.

Filter network 40 of FIG. 1 is a transmission network which freely passes a selected band or bands of frequencies and block or attenuates all other frequencies. Traces on a seismic record generally include rather continuous random disturbances resulting from energy coming to the geophones directly from the shot or created by outside disturbances such as moving objects in the vicinity or the wind. The reception of weak and multiple reflections is a further complication. It is known that by filtering the electrical outputs of the receiving geophones to eliminate high frequencies, the random disturbances of the type mentioned may be minimized. In general this is possible because seismic energy reflected or refracted from a deep substratum has been attenuated in its higher frequencies by a transmission through the earth. Consequently, disturbances of the type mentioned generally have a larger proportion of high frequency components. Thus, a filter network must be capable of attenuating undesirable higher frequencies without distorting the reflected or refracted seismic energy which is received by the geophones.

Figure 4:
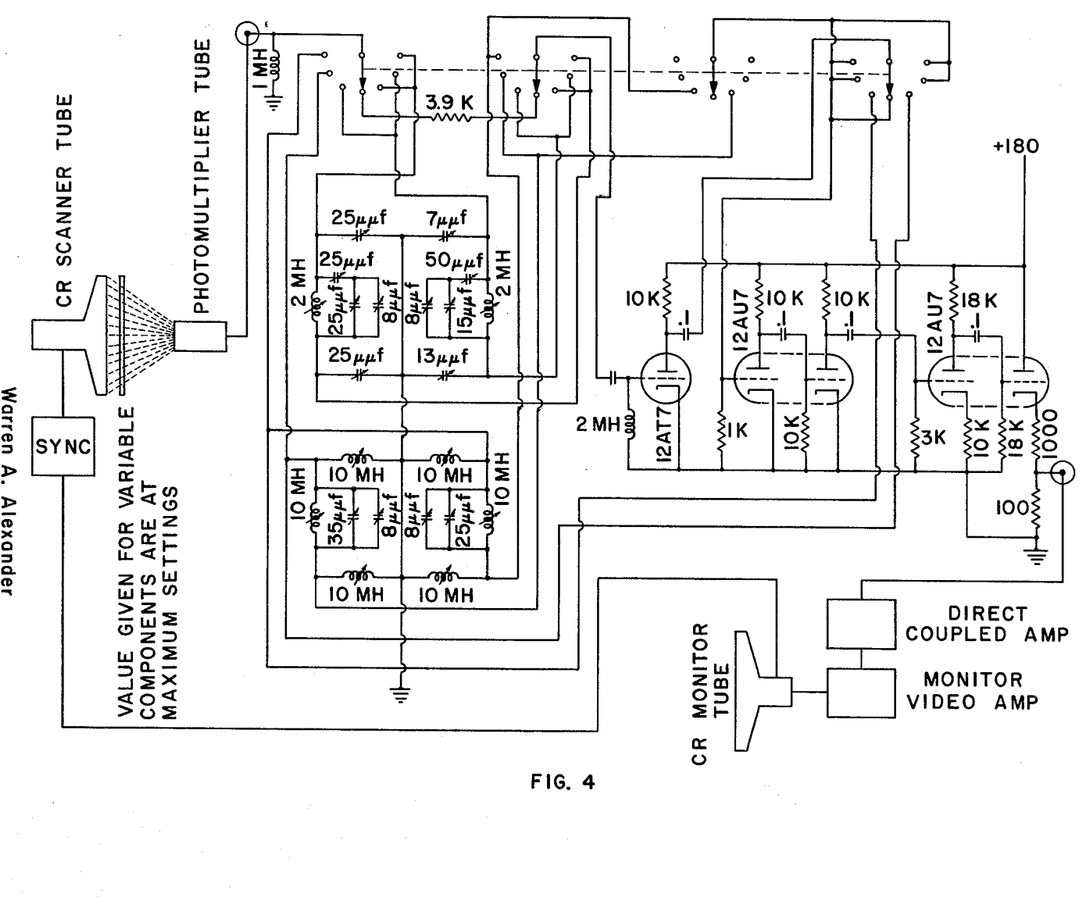
FIG. 4 is a schematic diagram of the filter system used in the embodiment of the invention shown in FIG. 1.

The design of filters is well known to the art. For this reason it is no part of the present invention to provide a particular filter network but rather the present invention contemplates the use of any filter system having the characteristics indicated. By way of example a suitable type is illustrated in FIG. 4.

Figure 5:
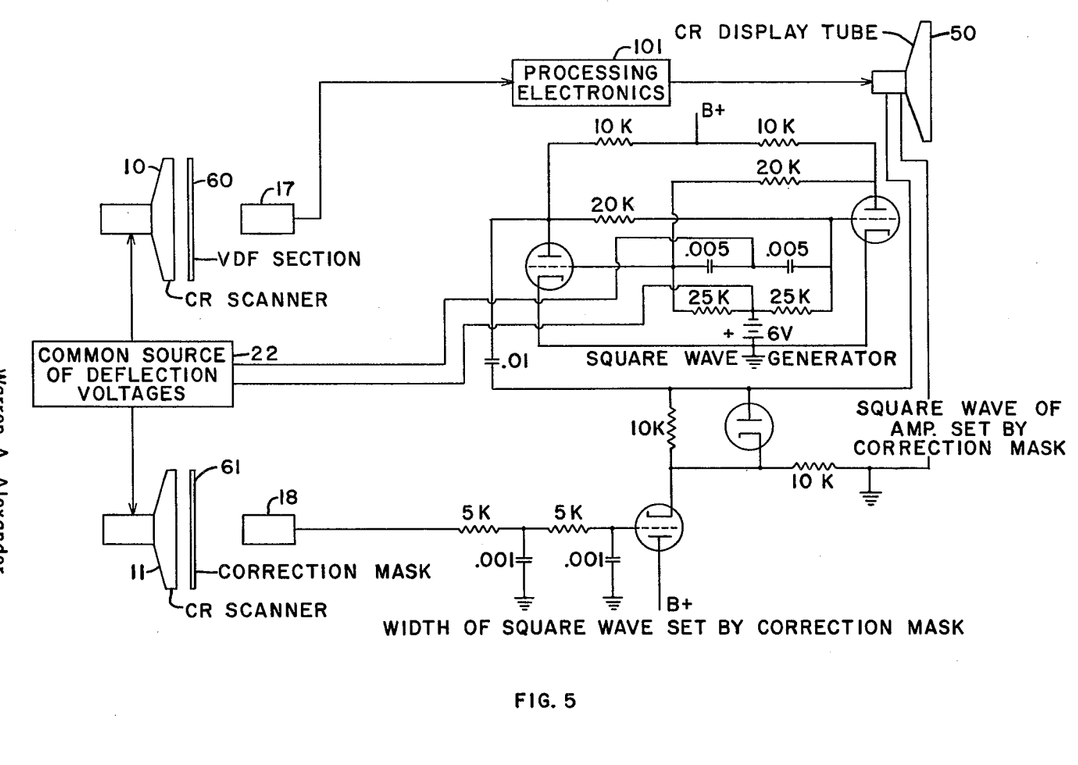
FIG. 5 is a schematic diagram of the static correction function used in the embodiment of the invention shown in FIG. 1; including a diagram of the square wave generating circuit.
Figure 6:
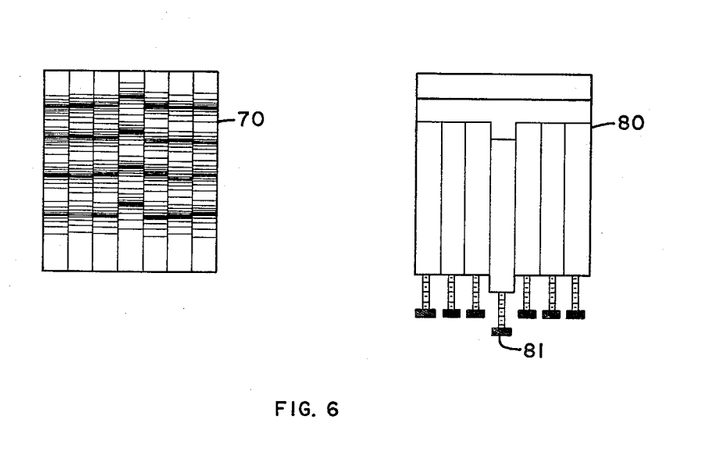
FIG. 6 illustrates a variable density form seismic section and a correction mask having adjustable gaps corresponding to the traces on the variable density form section utilized in the static correction system of FIG. 5.

A suitable time correction system for continuously processing variable density seismic sections in accordance with this invention is shown in FIG. 5. By means of this apparatus it is possible to determine the very best system of processing a seismic section in a very short time. The term "variable density" as employed herein is intended to include or designate seismic traces which are generally characterized by possessing a substantially constant width and a variable intensity or density which is proportional to the amplitude of the signal recorded. Traces of this type can be photographic in nature and also can be of the magnetic type wherein the traces are of substantially constant width but variable in their magnetic intensity. It is apparent the traces can also be variable in their color. This invention, however, is especially directed toward the preparation of variable density seismic sections of the photographic type, as sections of this type lend themselves most readily to graphic presentation and interpretation. A schematic diagram of a variable density film record 70 having seven seismograms arranged in side-by-side relation with respect to the recording time on the film is shown in FIG. 6. These variable records can be made by the technique outlined in U.S. Patent 2,051,153 by Frank Rieber. Each trace on the seismograms is of essentially uniform width throughout its length and consists of transverse striations of varying opacity in accordance with the signal recorded. Referring once again to FIG. 5 it is seen that a variable density section film 60 is scanned by a high speed cathode ray scanner 10 and that the signal output of photomultiplier tube 17 is passed through the processing electronics 101 comprising the components already discussed to cathode ray display tube 50 in the manner described above. A correction mask 61 having adjustable gaps corresponding to the traces on the variable density form section 60 is placed between scanner 11 and photomultiplier tube 18 and electrically coupled with scanner 10 by means of a common source of deflection voltage 22. The output of photomultiplier tube 18 is passed to a pulse shaping unit. By this means correction pulses of constant amplitude and variable width are converted to square waves of constant width with amplitude set by the correction mask. These correction signals are added to the sweep signals of the display cathode ray tube and result in variable density film section 60 being corrected proportionally and displayed in a corrected form. In the situation shown the center trace of section 70 is displaced downward. A suitable correction mask 80 is shown in FIG. 6.

The mask is constructed of opaque metal parts. The slit in the mask has one side of continuous straight line form, and the other side of the slit is made up of a number of slidably fitted members capable of movement normal to the slit. Each member is of the same width as the traces on the VDF section. By adjusting the placement of the members, the contour of the moveable edge of the slit is adjusted to give the desired correction pulses. This adjustment is normally done by a calibrated micrometer type screw and knob 81. By this means the center trace in this instance is displaced from the other traces corresponding to the correction needed on the original variable density section.

While the various electrical elements shown in the above circuits can have values over fairly wide ranges, for the sake of illustration a value is given adjacent each of the circuit elements of the drawing for one operative combination.

Having thus described the structural aspects of the invention attention is now directed toward the best mode contemplated for practicing the invention. In this connection it will be assumed that it is desired to process the variable density film negative seismic section consisting of a plurality of uncorrected seismograms, each seismogram comprising approximately 20 to 30 traces. Five to ten such records placed side-by-side will form a single section. Alternately, opaque seismic sections can be employed and scanned by reflection.

As a first step in the process the section to be processed is placed in a position to be scanned by a high speed scanner. The section is displayed on a cathode ray display tube such as a standard television receiver. The signal derived from scanning the section is then passed through the processing electronics of the system, including a trace mixer, a static correction system for vertical corrections and a filter network. This provides a very quick method for trying various corrections and various combinations of corrections on the section being studied. By means of the apparatus it is possible to study the time differentials and amplitude and frequency variations between certain impulses in one signal as compared to the other signals. Thus, it is possible to modify the time relationships and amplitude and frequency variations of the signals as they appear in the separate channels on the record and to study a group of signals together after their time relationship and amplitude and frequency variations have been altered as by filtering, mixing and the like. After the section has been processed under various conditions of filtering and compositing to obtain an optimum useable record, the optimum corrections are fed into playback apparatus whereby the magnetic tape or equivalent magnetic storage medium can be played back through a high quality amplifier utilizing these optimum corrections to produce a permanent visible record.

Normally it will not be necessary to make a spread correction as the visual type seismic section obtained from the original magnetic records generally will have been corrected for errors that are occasioned by the spread between the shot point and the geophone producing the signal for the trace. These and other dynamic corrections can be entered within the final seismic section with the aid of an analog computer which corrects the transposed information from each original trace. However, the advantage of including the dynamic correction function in the present system is that totally uncorrected sections can be processed. It will be apparent to those skilled in the art that electrical circuits can be constructed to continuously provide an electrical signal proportional to the spread corrections. Such a circuit can be disposed, for example, between the time (static) correction system 20 and the video amplifier 21 of FIG. 1. The function need only be capable of solving the geometric problem represented by the locations of the geophones which are disposed along the surface of the earth in a spaced relationship with respect to the shock point and also with respect to one another. Suitable analog computers utilizing electronic circuits or mechanical components are well known in the art.

It will be apparent that modifications in the processing apparatus of the present invention can be made without changing the fundamentals of operation. For example, rather than a cathode ray tube, the high-speed scanner can be mechanical, such as a whirling disc. Also, while specific embodiments of the present invention have been described, it will be evident to one skilled in the art that various other changes can be made without departing from the spirit or scope of the invention and it is intended to embrace such changes in the appended claims.

What is claimed is:

1. Apparatus for the analysis of a variable intensity seismic section which comprises high speed scanning means for sequentially scanning the traces upon a multiple trace section with a beam of light along the time axis of said traces, a photomultiplier responsive to light from said scanning means, means connected to said photomultiplier for altering the characteristics of a signal representing said traces, a cathode ray tube in which an electron beam is deflected horizontally and vertically connected to the output from said means for altering the characteristics of said signal, and means connected to said scanning means and said cathode ray tube for controlling said scanning means and the horizontal and vertical deflection of the electron beam in said tube.

2. Apparatus as defined by claim 1 wherein said photomultiplier is responsive to light transmitted by said seismic section from said scanning means.

3. Apparatus as defined by claim 1 wherein said means for altering the characteristics of said signals comprises a signal amplifier, an adjustable bandwith filter, and a video amplifier.

4. Apparatus for the analysis of a variable intensity seismic section which comprises a first cathode ray tube in which an electron beam is deflected horizontally and vertically; horizontal and vertical synchronization circuits connected to said first cathode ray tube, said synchronization circuits including means for deflecting said electron beam to permit sequential scanning of the traces upon a multiple trace seismic section along the time axis of said traces; a photomultiplier responsive to light from said first cathode ray tube; signal processing means including an adjustable bandpass filter connected to said photomultiplier; a second cathode ray tube in which an electron beam is deflected horizontally and vertically connected to the output from said signal processing means, said second cathode ray tube being connected to said horizontal and vertical synchronization circuits for the deflection of said electron beam in said tube; and means for altering the deflection of said electron beam in said second cathode ray tube in order to alter the relative position of traces represented on said second tube.

5. Apparatus as defined by claim 4 wherein said means for altering the deflection of said electron beam in said second cathode ray tube comprises a trace mixer circuit interconnected between said horizontal synchronization circuit and said second cathode ray tube.

6. Apparatus as defined by claim 4 wherein said means for altering the deflection of said electron beam in said second cathode ray tube comprises a time correction circuit interconnected between said vertical synchronization circuit and said second cathode ray tube.

7. Apparatus for the analysis of a variable density seismic section which comprises a first cathode ray tube in which an electron beam is deflected horizontally and vertically during operation of said tube, a vertical synchronization circuit connected to said first cathode ray tube, said vertical synchronization circuit including means for deflecting said electron beam vertically to permi scantning of a muliple trace seismic section along the time axis of the traces on said section, a horizontal synchronization circuit connected to said first cathode ray tube, said horizontal synchronization cirouit including means for deflecting said electron beam horizontally to permit sequential scanning of the traces upon said multiple trace seismic section, a photomultiplier responsive to light from said first cathode ray tube, a signal amplifier connected to the output from said first photomultiplier; a variable bandwidth bandpass filter connected to the output from said signal amplifier, a video amplifier connected to the output from said filter, a second cathode ray tube in which an electron beam is deflected horizontally and vertically during operation of said tube, a trace mixer interconnecting said horizontal synchronization circuit and said second cathode ray tube, and a time correction system interconnecting said vertical synchronization circuit and said second cathode ray tube.

8. Apparatus as defined by claim 7 wherein said time correction system comprises a third cathode ray tube in which an electron beam is deflected horizontally and vertically during operation of said tube, said third cathode ray tube being connected to said horizontal and vertical synchronization circuits; a correction mask for modifying the light beam emitted by said third cathode ray tube; a photomultiplier responsive to light from said third cathode ray tube; a pulse shaper connected to said photomultiplier; and means for adding pulses from said pulse shaper to signals transmitted from said vertical synchronization circuit to said second cathode ray tube.

9. Apparatus as defined by claim 7 wherein said trace mixer comprises a square wave generator and means for adding a square wave produced by said generator to a sawtooth wave form transmitted from said horizontal synchronization circuit to said second cathode ray tube.

10. A method for analyzing a multiple trace variable intensity seismic section which comprises sequentially scanning the traces on said seismic section along the time axis of said traces at high speed to produce an electrical signal containing frequencies proportional to but much higher than the frequencies represented on said traces, applying said electrical signal to a cathode ray tube to reproduce said traces on the screen of said tube, and thereafter adjusting the amplitudes and frequency characteristics of said electrical signal applied to said tube until traces more susceptible of interpretation are obtained upon the screen of said tube.

11. A method for analyzing a multiple trace variable density seismic section which comprises repeatedly scanning the traces on said section at high speed along the time axis of said traces to produce an electrical signal containing frequencies proportional to but much higher than the frequencies represented on said traces, said electrical signal representing information scanned from all of the traces on said seismic section; filtering said electrical signal to eliminate components attributable to noise; applying the filtered signal to a cathode ray tube to reproduce said traces on the screen of said tube; adjusting the bandwidth characteristics of said electrical signal applied to said cathode ray tube until races more susceptible of interpretation are obtained on the screen of said tube; and thereafter recording the electrical signal producing said traces more susceptible of interpretation.

References Cited in the file of this patent

UNITED STATES PATENTS

| | | |
|---|---|---|
| 2,392,758 | Minton | Jan. 8, 1946 |
| 2,495,790 | Valensi | Jan. 31, 1950 |
| 2,628,689 | Rieber | Feb. 17, 1953 |
| 2,657,276 | Eliot | Oct. 27, 1953 |
| 2,658,579 | Rieber | Nov. 10, 1953 |
| 2,703,150 | Rieber | Mar. 1, 1955 |
| 2,757,357 | Peterson | July 31, 1956 |
| 2,766,400 | Clark | Oct. 9, 1956 |
| 2,794,966 | McCarty | June 4, 1957 |
| 2,803,809 | Tilley | Aug. 20, 1957 |
| 2,826,750 | Grannemann | Mar. 11, 1958 |
| 2,897,477 | Lindsey | July 28, 1959 |
| 2,912,673 | Groenendyke | Nov. 10, 1959 |
| 2,922,070 | Seevers | Jan. 19, 1960 |